Figure 1:
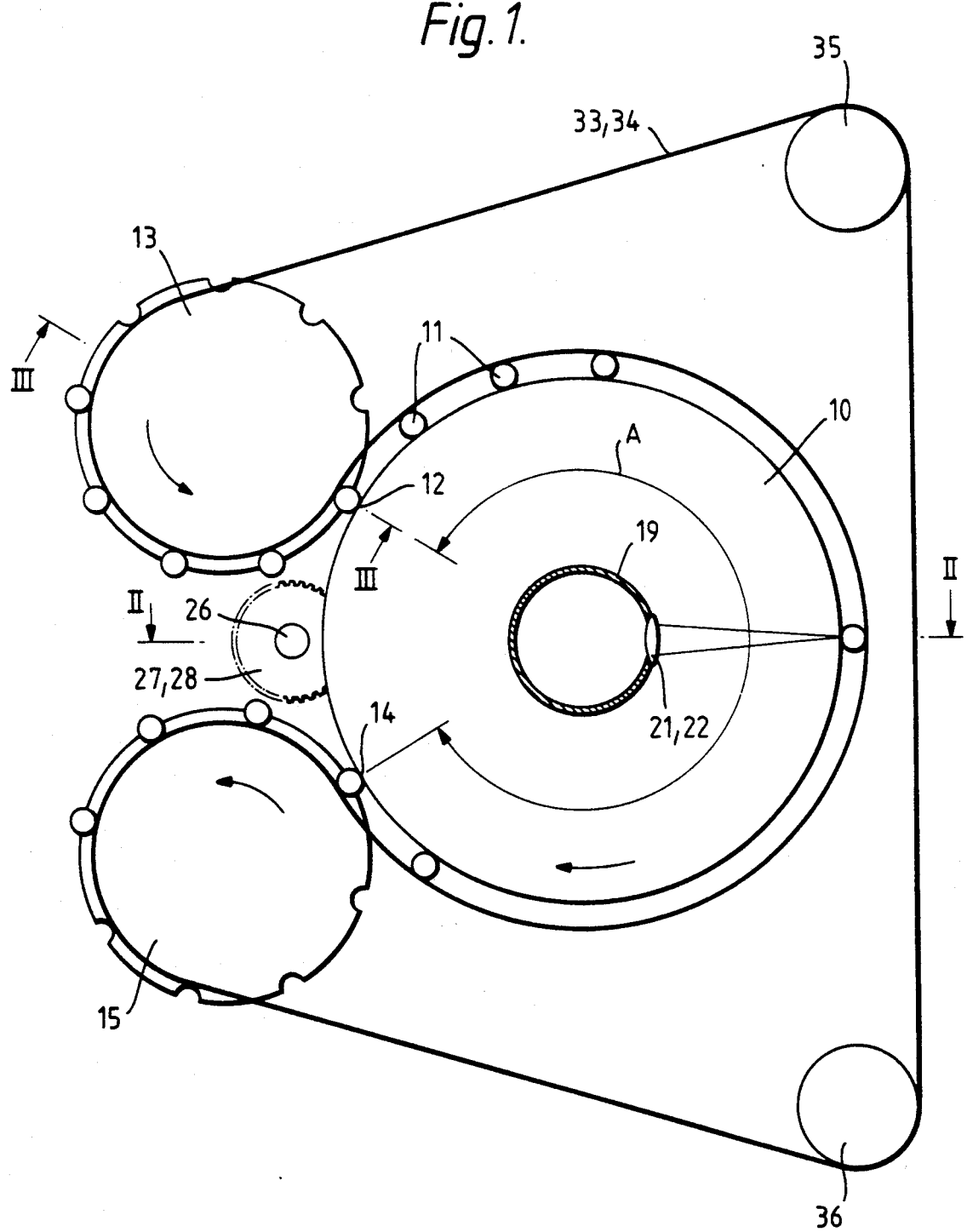

United States Patent [19]

Arthur

[11] Patent Number: 5,148,818
[45] Date of Patent: Sep. 22, 1992

[54] CIGARETTE MANUFACTURE

[75] Inventor: Hugh M. Arthur, Aylesbury, England

[73] Assignee: Molins plc, London, England

[21] Appl. No.: 363,878

[22] Filed: Jun. 9, 1989

[30] Foreign Application Priority Data

Jun. 9, 1988 [GB] United Kingdom ............... 8813683

[51] Int. Cl.⁵ .................... A24C 5/60; B23K 26/00
[52] U.S. Cl. .................. 131/281; 219/121.7; 219/121.71
[58] Field of Search ............. 131/281; 219/121.7, 219/121.71

[56] References Cited

U.S. PATENT DOCUMENTS 3,483,873 12/1969 Hinzmann.
4,281,670 8/1981 Heitmann et al.

FOREIGN PATENT DOCUMENTS 2119223 11/1983 United Kingdom ............... 131/281
2155753 10/1985 United Kingdom ............... 131/281
2167936 6/1986 United Kingdom.

*Primary Examiner*—Vincent Millin
*Attorney, Agent, or Firm*—Antonelli, Terry, Stout & Kraus

[57] ABSTRACT

Laser perforation apparatus for filter cigarettes includes a drum (10) for conveying cigarettes (11), bands (33, 34) for slowly rotating each cigarette as it is conveyed by the drum, and a laser beam deflector (21, 22) carried by a tubular member (19) coaxially and rotatably mounted relative to the drum, the tubular member being rotated at relatively high speed and the laser being pulsed so that successive pulses are directed by the deflector towards successive cigarettes and each cigarette thus has a number of perforations formed in its wrapper as it is conveyed between the drum and the bands.

11 Claims, 2 Drawing Sheets

CIGARETTE MANUFACTURE

This invention is concerned with the manufacture of ventilated cigarettes including perforations in the wrapper of the cigarette, near the mouth end of the cigarette (typically in the region of the filter), formed in the otherwise-completed cigarettes by a laser beam. Examples of such methods of perforating cigarettes are described in U.S. Pat. No. 4,281,670 and particular reference is directed to the example illustrated in FIGS. 15 and 16 thereof.

According to the present invention apparatus for perforating cigarettes comprises a drum, means for delivering cigarettes onto the drum at a delivery point, means for removing cigarettes from the drum at a withdrawal point; means for rotating each cigarette about its axis through at least substantially one revolution as it moves from the delivery point to the withdrawal point; laser means arranged to direct a laser beam along the axis of the drum; a laser beam deflector arranged to rotate about the axis of the drum at a speed considerably greater than that of the drum, the laser being pulsed so that successive pulses are directed by the deflector towards successive cigarettes and that each cigarette thus has a number of perforations formed in its wrapper as it moves between the delivery and withdrawal points; and a rotatable member carrying the laser beam deflector and being coaxial with and rotatably supporting said drum.

This invention compares favorably with prior proposals and specifically with the example shown in FIGS. 15 and 16 of the abovementioned patent, at least in that it avoids the need for spinning the cigarette at high speed and the associated lateral deceleration and acceleration of the cigarettes with consequent risk of damage to the cigarettes. This invention allows each cigarette to be rotated slowly about its axis, the perforations being formed during the passage of each cigarette from the delivery point to the withdrawal point; preferably each cigarette rotates through substantially one revolution while being perforated, but it is possible instead to rotate each cigarette through substantially an integral number of revolutions while it is travelling between the delivery and withdrawal points and is being perforated by the laser.

In a preferred construction the deflector is mounted within a tubular member which is driven at the appropriate high speed, and the drum is rotatably mounted around the tubular member and has an external drive. This construction is particularly suitable if doublelength cigarettes are to be perforated (i.e. before final cutting to produce individual filter tipped cigarettes). For this purpose the deflector may comprise a semi-silvered part for deflecting half of the laser beam radially outwards to form one row of perforations, and a fully-silvered part which deflects the remainder of the laser beam outwards to form the other row of perforations; lenses for both parts of the laser beam are mounted on the tubular member; the drum is in two parts axially spaced apart and separately mounted rotatably on the tubular member, so that the outwardly deflected laser beams can pass between the two parts of the drum.

Figure 2:
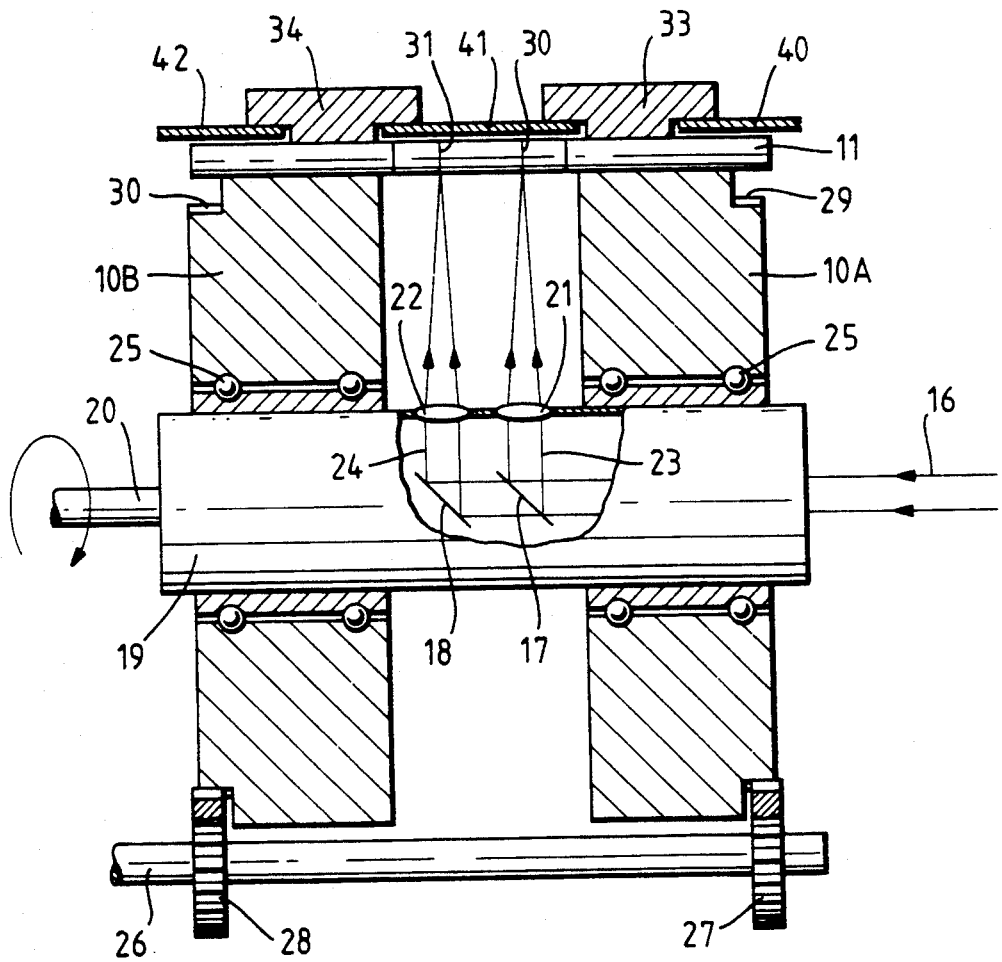
Figure 3:
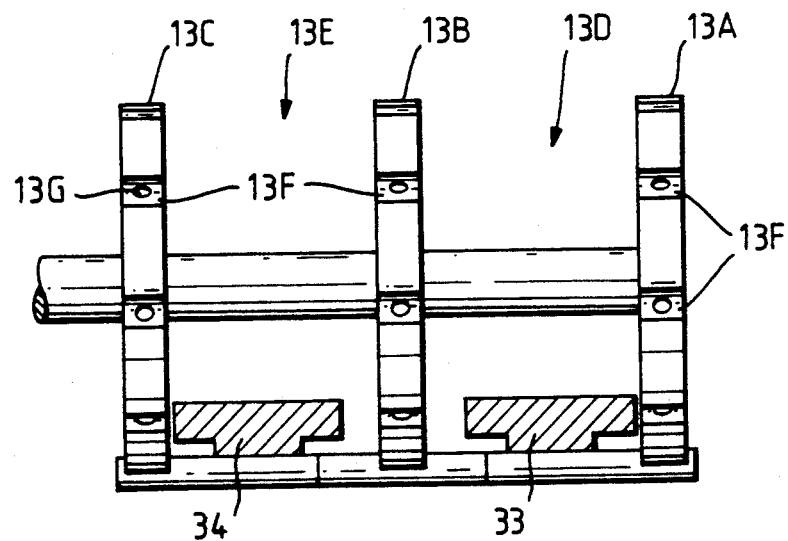

An example of apparatus according to this invention is shown in the accompanying drawings. In these drawings:

FIG. 1 is a schematic end view of the apparatus;
FIG. 2 is a section along the line II—II in FIG. 1; and
FIG. 3 is a section along the line III—III in FIG. 1.

As shown in FIG. 1, the apparatus includes a main drum 10 to which double cigarettes 11 are delivered at a delivery point 12 by a fluted delivery drum 13. After passing around the drum 10 in a clockwise direction, the perforated cigarettes are removed from the drum 10 at a withdrawal point 14 by a second fluted drum 15.

As shown particularly in FIG. 2, a laser beam 16 is directed along the axis of the drum 10 and is deflected radially outwards by a two-part deflector comprising a semi-silvered deflector 17 and a fully-silvered deflector 18. Both of these deflectors are fixed with respect to a tubular member 19 which is driven by a shaft 20 and carries two lenses 21 and 22 for focusing the resulting laser beams 23 and 24 onto the cigarettes; the shaft 20 may be hollow to allow the laser beam to pass through it on the way to the deflectors. As shown also in FIG. 2, the drum 10 is in two parts 10A and 10B which are spaced apart axially so as to allow the laser beams 23 and 24 to pass radially outwards between them. Each of the drum portions 10A and 10B is rotatably mounted on the tubular member 19 by means of a roller bearing 25. A drive shaft 26 carries gear wheels 27 and 28 which engage gear teeth 29 and 30 formed respectively in recessed annular end portions of the drum portions 10A and 10B. The drum portions 10A and 10B are thus driven by drive shaft 26 at the same speed and in the same direction. As will be described in more detail hereinafter, the laser tube 19 is driven at a rotational speed which is greater than the speed of rotation of the drum 10, so that successive cigarettes carried on the drum 10 will be perforated by laser beams 23 and 24.

While each double cigarette 11 is travelling from the delivery point 12 to the withdrawal point 14, it is rotated slowly about its own axis through substantially one revolution to enable the laser beams 23 and 24 to form rows of perforations 30 and 31 around the respective halves of each double cigarette. For this purpose, the laser is pulsed to produce a burst of laser energy as the axes of the lenses 21 and 22 arrive at successive points in alignment with successive cigarettes 11. It will be understood that this pulsing may cease while the lens axes are travelling between the withdrawal point 14 and the delivery point 12.

In the example shown in the drawings, each cigarette is rotated, while moving between the points 12 and 14, by being rolled between the outer surface of the drum 10 and two belts 33 and 34 which are shown fully in FIG. 2 and diagrammatically in FIG. 1. Each of the belts 33 and 34 passes around a recessed portion of each of the fluted drums 13 and 15, and around two guide rollers 35 and 36. Each belt has a toothed formation on its inner face to receive a drive from the roller 35 (as shown) or alternatively from gear teeth formed on the recessed portions of the fluted roller 15. The belts 33 and 34 move at a speed equal to that of the cigarettes as they leave the delivery roller 13, while the peripheral speed of the drum 10 is preferably slightly greater so as to roll the cigarettes forward with respect to the belts and thus produce the desired rotation.

By way of example, if the belts move around the axis of the drum at a speed of 1,000 RPM, for producing N perforations in each cigarette, there would be N cigarettes at equally spaced intervals around the drum between the delivery and withdrawal points 12 and 14, and where the angle (in radians) between the points 12 and 14 is A, the rotational speed of the drum 10 would be $$1000 \times 2\pi/A \times (N+2)/N$$

The speed of rotation of the laser tube 19 in this example would be $$2\pi N/A \times 1000 \times 2\pi/A \times (N+1)/N$$

The laser for this purpose would be fired at 1000N pulses per minute through the arc extending from the delivery point 12 to the withdrawal point 14.

In order to constrain the belts to move along a path uniformly spaced from the surface of the drum 10 by a distance sufficient to grip the cigarettes lightly, each of the belts has recessed side portions which are supported by fixed arcuate guides 40, 41 and 42 shown in FIG. 2.

As shown in FIG. 3, the cigarette delivery drum 13 comprises in effect three axially spaced portions 13A, 13B and 13C defining between them recesses 13D and 13E for receipt of the belts 33 and 34. Each of the portions 13A, 13B, 13C of the drum has flutes 13F formed with suction passages 13G whereby the cigarettes are held on the drum 13 until they arrive at the delivery point 12 at which the belts help to strip the cigarettes off the drum 13. The drum 15 is similarly constructed.

A laser suitable for generating the light pulses required by this invention may be a CO2 TEA (Transversely Excited Atmospheric) laser of the type manufactured by Lumonics Inc. and designated as their model 948 HS laser. Alternatively the laser could be of the Q-switch type.

Instead of supporting double cigarettes 11 each drum part 10A and 10B could support separate single length cigarettes, i.e. the drum 10 could be arranged to receive individual cigarettes produced by cutting the double cigarettes 11 at their mid-points.

I claim:

1. Apparatus for perforating cigarettes, comprising a drum, means for delivering cigarettes in pairs onto the drum at a delivery point, means for removing cigarettes from the drum at a withdrawal point; means for rotating each cigarette pair about its axis through at least substantially one revolution as it moves from the delivery point to the withdrawal point; laser means arranged to direct a laser beam along the axis of the drum; a laser beam deflector; a rotatable member in the form of a tube containing the laser beam deflector and being coaxial with and rotatably supporting said drum, so that said laser beam deflector is rotatable with said rotatable member about the axis of the drum; and drive means for rotating the rotatable member at a speed greater than that of the drum, the laser being pulsed so that successive pulses are directed by the rotating deflector simultaneously towards successive cigarette pairs and that each cigarette of a cigarette pair thus has a number of perforations formed in its wrapper as it moves between the delivery and withdrawal points; wherein said drum comprises axially spaced parts for supporting respective cigarettes of each cigarette pair, said laser beam deflector being arranged to direct a laser beam towards the cigarette pairs between said axially spaced drum parts.

2. Apparatus as claimed in claim 1, wherein the tube has a substantially continuous cylindrical surface including at least one part transparent to a laser beam.

3. Apparatus as claimed in claim 2, wherein said part comprises a focusing element.

4. Apparatus as claimed in claim 1, wherein said laser beam deflector includes means for directing laser beams at positions spaced relative to the length of a cigarette.

5. Apparatus as claimed in claim 4, wherein said laser beam deflector includes at least one semi-silvered mirror for deflecting part of a laser beam.

6. Apparatus as claimed in claim 4, including axially spaced focusing means carried by said tube for directing separate laser beams at said cigarettes.

7. Apparatus as claimed in claim 1, including drive means for rotating the rotatable means at high speed relative to said drum.

8. Apparatus as claimed in claim 1, including drive means for rotating said drum relative to said rotatable means and to convey cigarettes from said delivery point to said withdrawal point.

9. Apparatus for perforating cigarettes, comprising a drum, means for delivering cigarettes onto the drum at a delivery point, means for removing cigarettes from the drum at a withdrawal point; means for rotating each cigarette about its axis through at least substantially one revolution as it moves from the delivery point to the withdrawal point; laser means arranged to direct a laser beam along the axis of the drum; a laser beam deflector arranged to rotate about the axis of the drum; a rotatable member in the form of a tube containing the laser beam deflector and being coaxial with and rotatably supporting said drum, so that said laser beam deflector is rotatable with said rotatable member about the axis of the drum; and drive means for rotating the rotatable member at a speed greater than that of the drum, the laser being pulsed so that successive pulses are directed by the rotating deflector simultaneously towards successive cigarette pairs and that each cigarette of a cigarette pair thus has a number of perforations formed in its wrapper as it moves between the delivery and withdrawal points; wherein said drum comprises axially spaced parts for supporting separate cigarette parts, said laser beam deflector being arranged to direct a laser beam towards the cigarettes between said axially spaced drum parts, wherein the means for rotating each cigarette comprises band means engaging the outer peripheries of cigarettes carried by said drum, and means for causing said band to move around said drum with a speed which differs from the peripheral speed of the drum.

10. Apparatus for perforating cigarettes, comprising a drum, means for delivering cigarettes onto the drum at a delivery point, means for removing cigarettes from the drum at a withdrawal point; means for rotating each cigarette about its axis through at least substantially one revolution as it moves from the delivery point to the withdrawal point; laser means arranged to direct a laser beam along the axis of the drum; a laser beam deflector arranged to rotate about the axis of the drum; means for rotating said laser beam deflector at a speed grater than that of the drum, the laser being pulsed so that successive pulses are directed by the deflector towards successive cigarettes and that each cigarette thus has a number of perforations formed in its wrapper as it moves between the delivery and withdrawal points; band means engaging the outer peripheries of cigarettes carried by said drum; and means for causing said band to move around said drum with a speed which differs from the peripheral speed of the drum.

11. Apparatus for perforating cigarettes, comprising a drum, means for delivering cigarettes in pairs onto the drum at a delivery point, means for removing cigarettes from the drum at a withdrawal point; a tubular member coaxial with and rotatably supporting the drum; laser means arranged to direct a laser beam along the axis of the tubular member; a laser beam deflector within said tubular member for deflecting said laser beam towards cigarettes of successive cigarette pairs carried by said drum, said tubular member having wall means including a part transparent to laser radiation and through which a deflected beam may be directed; and drive means for causing relative rotation of said drum and said tubular member, whereby successive cigarette pairs pass said deflected beam and receive at least one perforation therefrom, wherein said drum comprises axially spaced parts for supporting respective cigarettes of each cigarette pair, said laser beam deflector being arranged to direct a laser beam towards the cigarettes between said axially spaced drum parts, wherein said drive means includes means for rotating said drum at a first speed and means for rotating said tubular member at a second speed.

* * * * *